United States Patent [19]
Collette et al.

[11] Patent Number: 5,908,185
[45] Date of Patent: *Jun. 1, 1999

[54] HANDRAIL AND BUMPER COMBINATION

[75] Inventors: Roderick E. Collette; Ronald R. Peck, Jr., both of Pawling, N.Y.

[73] Assignee: Pawling Corporation, Pawling, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,387

[22] Filed: Sep. 24, 1996

Related U.S. Application Data

[60] Provisional application No. 60/005,285, Oct. 12, 1995.

[51] Int. Cl.$^6$ .................................................. A47B 95/00
[52] U.S. Cl. ........................................... 248/345.1; 256/59
[58] Field of Search ................................ 248/345.1, 251; 256/59, 65, 67, 68, 1; 52/716.1, 27, 33, 717.03, 717.05

[56] References Cited

U.S. PATENT DOCUMENTS

| | | | |
|---|---|---|---|
| 1,173,398 | 2/1916 | Orden | 52/27 X |
| 2,063,585 | 12/1936 | Comstock | 248/345.1 X |
| 3,825,229 | 7/1974 | Bartlett et al. | 248/251 X |
| 3,991,537 | 11/1976 | Brown | 248/345.1 X |
| 4,196,552 | 4/1980 | Bartlett | 256/59 X |
| 4,200,261 | 4/1980 | Bartlett | 256/59 |
| 4,220,316 | 9/1980 | Naka et al. | 256/1 X |
| 4,222,552 | 9/1980 | Matteo, Sr. | 248/345.1 X |
| 4,353,529 | 10/1982 | Brown | 256/59 |
| 5,165,643 | 11/1992 | Shreiner | 248/251 |
| 5,273,258 | 12/1993 | Bedics | 256/59 |
| 5,288,048 | 2/1994 | Shreiner | 248/251 |
| 5,427,359 | 6/1995 | Moulton | 256/59 |

FOREIGN PATENT DOCUMENTS

| | | | |
|---|---|---|---|
| 4277254 | 10/1992 | Japan | 52/716.1 |

OTHER PUBLICATIONS

Pawling Selection Guide, p. 13, dated 1989.
Institutional Products Corporation, 1200/1255 Handrail.
Construction Specialties, Inc. Models HRB–10C and 16C, and HRBW–10C.

*Primary Examiner*—Derek J. Berger
*Assistant Examiner*—Stephen S. Wentsler
*Attorney, Agent, or Firm*—Schweitzer Cornman Gross & Bondell LLP

[57] ABSTRACT

A handrail-wall bumper combination which includes improved structural features for the mounting of the handrail above the bumper section, providing a common appearing design for both vinyl and wood handrail portions and accommodating, in the case of either type of handrail, a smoothly contoured gripping surface, including a well-defined and highly visible accent strip. Smooth, tangentially transitioning concave and convex surfaces are provided in front and also in back of the handrail where, although not visible to the eye, such surfaces provide improved comfort and feel and reduce skin abrasions. Improved components are also provided for assembling corners and returns, including providing slightly enlarged support surfaces for longitudinal extensions of plastic cover elements to assure optimum surface alignment at joints. Improved arrangements are also provided for improving section-to-section alignment of wood handrail elements, by providing a continuous longitudinal recess in the metal handrail support, for receiving an alignment dowel.

8 Claims, 7 Drawing Sheets

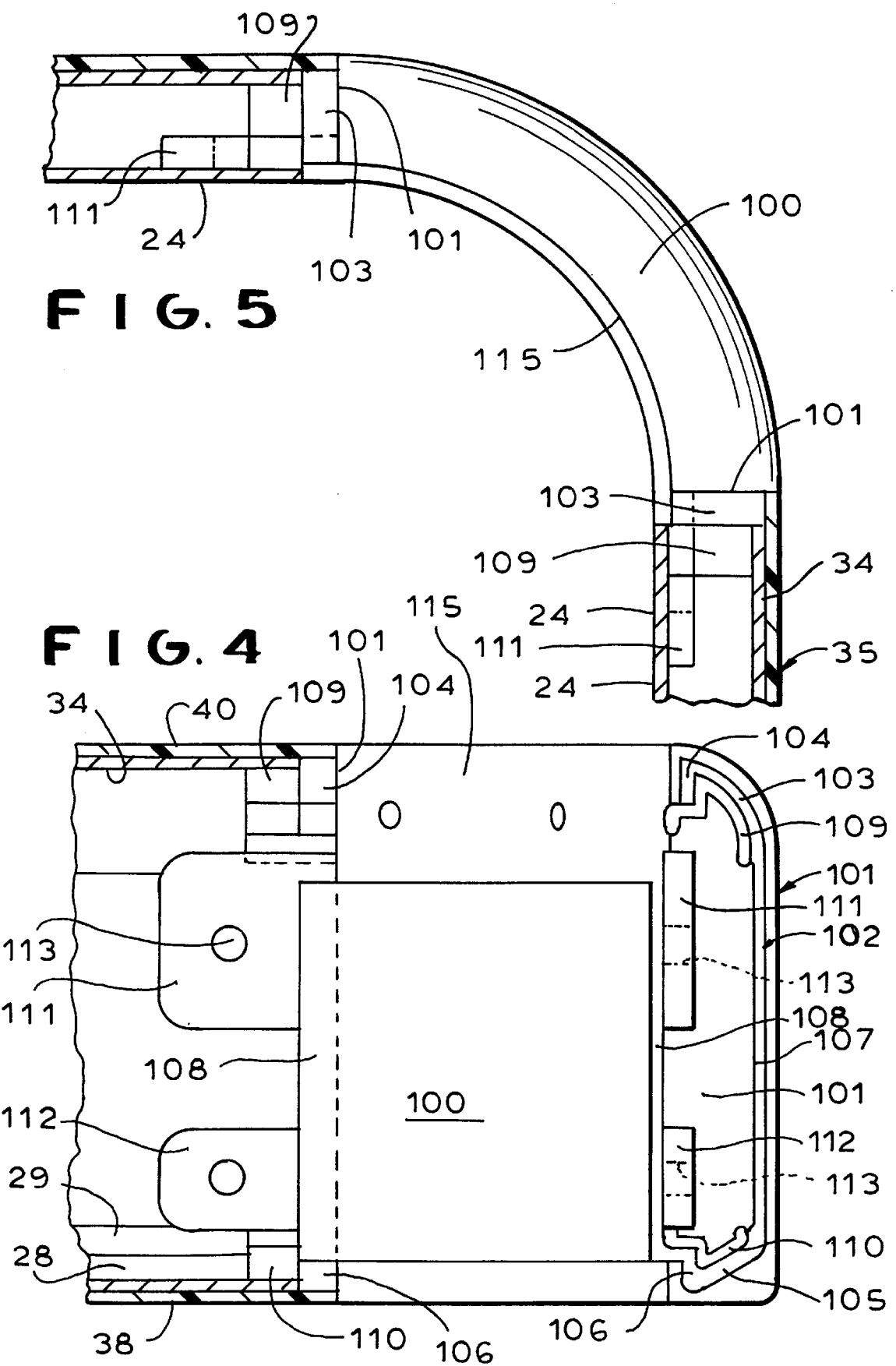

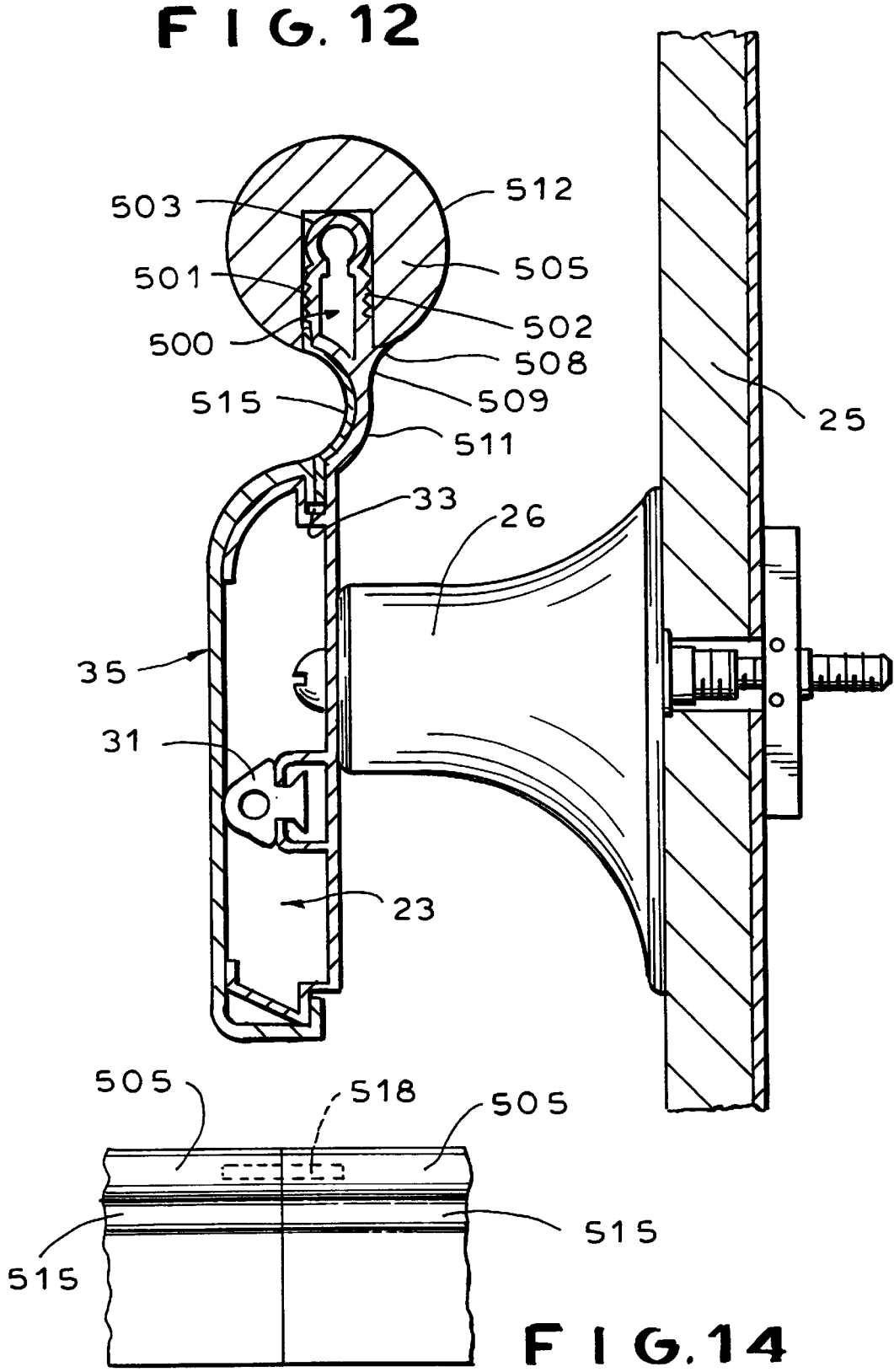

HANDRAIL AND BUMPER COMBINATION

This application claims priority of provisional application Ser. No. 60/005,285, filed Oct. 12, 1995.

BACKGROUND AND SUMMARY OF THE INVENTION

In many types of buildings occupied and used by significant numbers of people, it is common practice to install handrails along the halls and corridors to assist people in traversing these areas. Such facilities are particularly useful and almost universally found in such structures as hospitals, convalescent homes and the like. In structures of the latter type, the passage ways are traversed not only by people, but also by wheeled equipment of various types. In these installations, it has become common to employ combined handrail and bumper assemblies, which are installed along the walls and provide a hand grip for the convalescent and infirm, and also a means for protecting the walls from being damaged by careless handling of wheeled vehicles. Combination handrail-bumper installations for this purpose are known and have been commercially available. Examples of such previously available unitary handrail-bumper systems of design are the BR-300 and BR-800 handrails marketed by Pawling Corporation, of Pawling, N.Y. These devices incorporate an elongated, extruded aluminum support or retainer over which is placed a semi-rigid plastic shell or cover. The cover is contoured so that the upper portion thereof forms a comfortable hand grip, while lower portions provide a contact cushion against bumping by vehicles, etc.

Recent architectural preferences have indicated a desire for handrail-bumper combinations to incorporate handrail elements which can be of different colors than other portions of the structure, or even of different materials. For example it may be desirable to have the handrail portion formed of a rigid vinyl shell, of the same or different color than the associated bumper portion below, or there may be a desire for the handrail portion to be formed of wood. Additionally, there is an architectural desire for accent strips, optionally of a different color, joining a handrail portion along the top with a bumper portion along the bottom Particularly in institutional structures, such as hospitals, the use of such accent strips is desired to enable color coding of different areas of the structure Early attempts to provide for design flexibility in the choice of handrail materials and/or accent strips and the like have been only partially satisfactory, because the structures have tended to be relatively crude and angular. Such arrangements are not only visually unattractive, but are functionally disadvantageous Flat, angular surfaces are difficult to keep clean. In addition, surfaces that present edges and corners can easily cause tears and abrasions in the skin of elderly patients, who are the most likely group of individuals to be utilizing the handrails for support.

In accordance with the present invention, a novel and improved handrail-bumper combination assembly is provided which readily accommodates the current architectural requirements of flexible design in terms of materials, colors, etc. yet which also provides a functionally superior structure with smooth, blending curved surfaces free of sharp corners and the like, which are both unsightly and likely to cause minor injuries to the fragile skin of elderly patients. The basic conceptual design of the invention is readily adaptable to handrails which are formed of wood or are provided with a rigid vinyl cover, in either case being provided with the facility to mount a highly visible, yet evenly contoured accent strip.

In accordance with another aspect of the invention, novel and improved structural features are provided for installing returns and corners for the handrail-bumper combination. The arrangement of the invention provides for greater strength and improved visual appearance at corners and returns, as well as minimizing the component parts required to construct both inside and outside corners, for example.

For a more complete understanding of the above and other features and advantages of the invention, reference should be made to the following detailed description of preferred embodiments of the invention and to the accompanying drawings.

DESCRIPTION OF THE DRAWINGS

FIGS. 4 and 5 are a side elevational and top plan view respectively of a lower or bumper portion of a corner assembly incorporated in the installation of FIGS. 2 and 3.

FIG. 12 is a cross sectional view, similar to FIG. 1, showing an alternative form of handrail-bumper combination.

FIG. 14 is a fragmentary elevational view, illustrating an installation of the handrail-bumper of FIG. 12 with means for aligning successive sections thereof.

DESCRIPTION OF PREFERRED EMBODIMENTS

Figure 1:
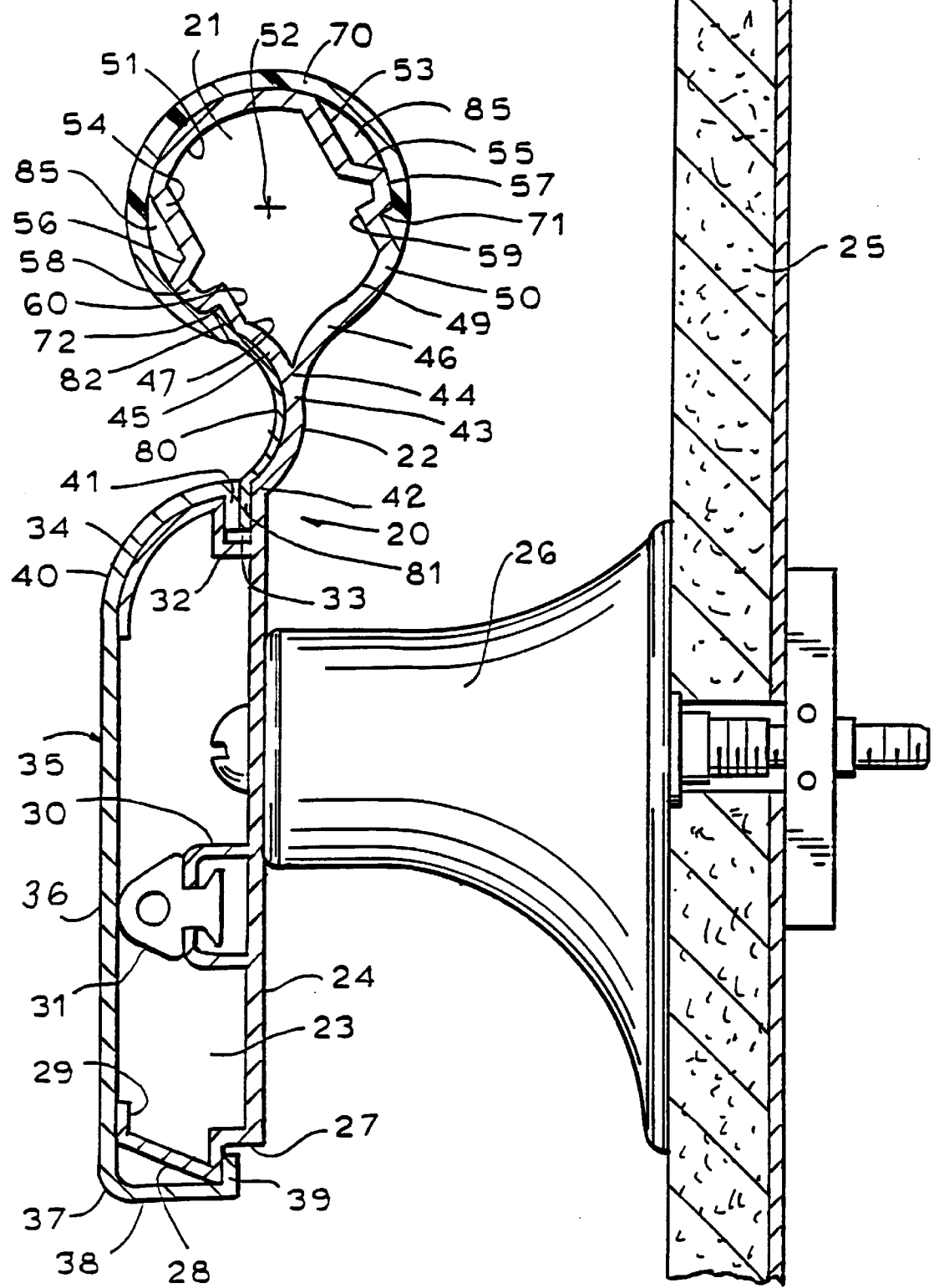
FIG. 1 is a cross sectional view of a preferred form of handrail-bumper assembly constructed in accordance with the invention.
Figure 2:
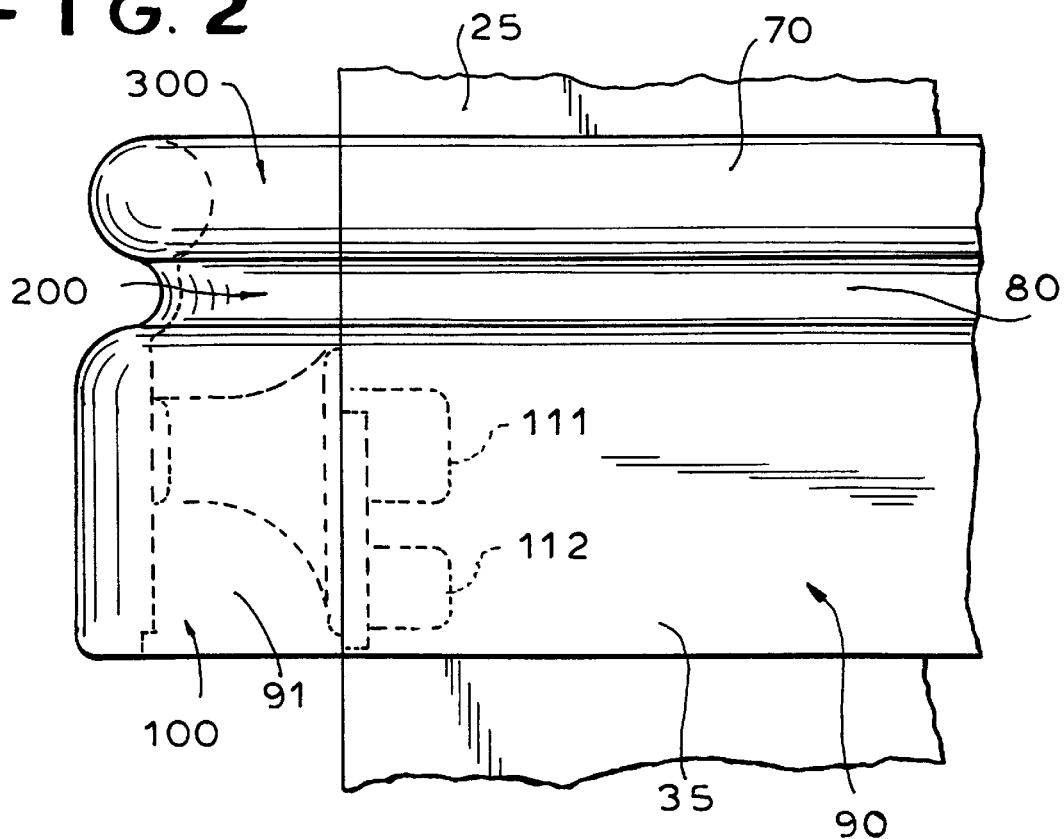
FIGS. 2 and 3 are side elevational and top plan views respectively of a handrail-bumper installation of FIG. 1 shown mounted at a corner of two walls.
Figure 3:
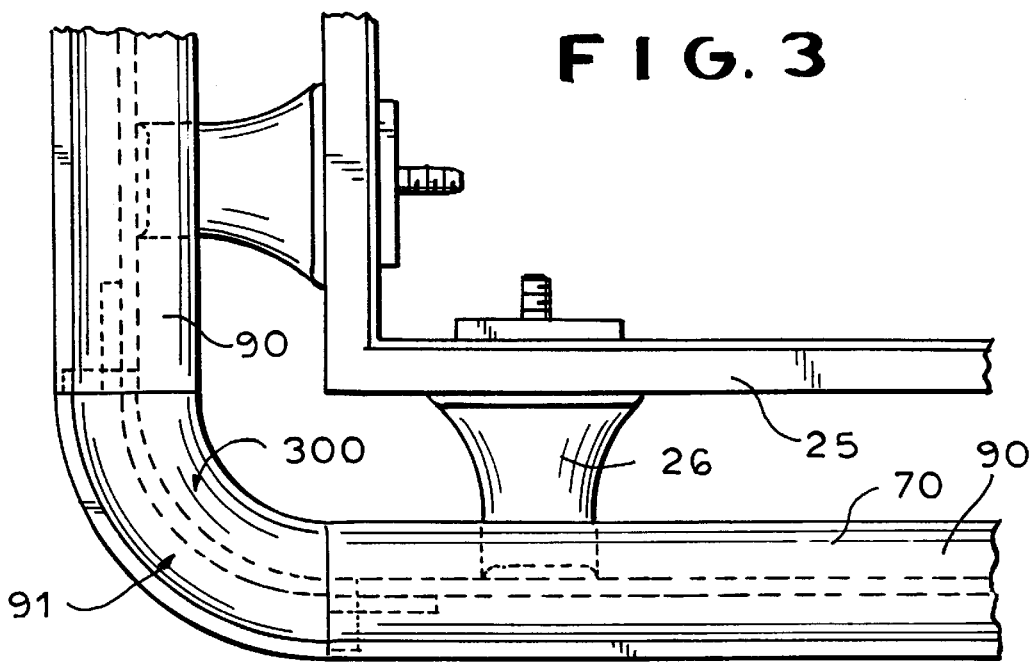

Referring now to the drawings, and initially to FIGS. 1–3 thereof, the reference numeral 20 designates generally a metal support member or retainer, typically of extruded aluminum, and of uniform cross section throughout The illustrated support has an upper or handrail support portion 21, an intermediate portion 22, and a lower or bumper support portion 23. The configuration of the lower portion 23 is, in general, previously known. However, as will be described, it is associated in a unique and advantageous manner with the intermediate and upper portions.

The lower portion 23 includes a generally flat, vertically oriented back wall 24, by which the support can be secured in spaced relation to a wall 25, using spaced-apart stand-off supports 26, in a known manner. At its lower end, the lower portion 23 is configured to provide a lower retaining notch 27, a forwardly and upwardly inclined displacement surface 28, and a short, vertically extending support flange 29.

At an intermediate level, the lower portion 23 is provided with an integral, longitudinally extending channel 30 arranged to receive and support a resilient back-up strip 31, formed of suitably resilient material.

Near the upper edge of the lower portion 23, an L-shaped integral flange 32 is provided, to form an upper retaining notch 33. Extending integrally from the L-shaped flange 32 is a forwardly convex support flange 34, which extends forward and then downward from the upper edge of the flange 32.

Pursuant to known constructions, the bumper support portion 23 is arranged to receive and retain a plastic cover 35, formed of extruded, rigid polyvinyl chloride. The cover 35, which may be referred to as a bumper cover, includes a generally flat, vertically oriented front wall 36, which is supported at a midpoint by the resilient backup strip 31. At its lower edge, the cover has a rounded corner 37, a rearwardly extending bottom wall 38 and a short upwardly extending retaining flange 39. At its upper edge, the bumper cover is forwardly convexly contoured, as at 40, to conform closely with the convex contours of the support flange 34. A short, downwardly extending retaining flange 41 is provided along the rearward edge of the arcuate wall 40.

After securing of the aluminum support 20 to the stand-off supports 26, the bumper cover 35 is installed on the support by inserting the upper retaining flange 41 into the upper retaining recess 33, and then pressing inwardly on the lower edge portions of the cover. The lower retaining flange 39 is deflected downwardly by the flange surface 28, until the retaining flange 39 is in a position to snap into the lower retaining recess 27. The bumper structure just described is, in general, a known and reliable construction.

Extending upwardly and rearwardly from the upper extremity 42 of the back wall 24 is a forwardly concave arcuate web section 43 forming part of the intermediate portion 22. At its lower edge the web section 43 is contoured to form a generally smooth, substantially tangential transitional continuation of the contours of the arcuate cover wall 40 and the underlying arcuate support flange 34. As shown in FIG. 1, the intermediate web portion 22 curves smoothly upward and then forward, dividing at a midpoint 44 into forwardly and rearwardly extending arcuate web sections 45, 46, respectively The front web section 45 is contoured to form a continuation of the arcuate contour of the concave web section 43 and terminates at 47, which can be considered the upper forward limit of the intermediate portion 22.

The rear arcuate web portion 46, which also comprises part of the intermediate portion 22, is rearwardly concave, and merges tangentially in a smooth transition with the rearwardly convex curvatures of the web section 43. The upper rear web section 46 can be considered as terminating at about 49, where it merges tangentially with the rearwardly convex contours of a wall section 50, forming part of the upper or handrail portion 21 of the support member. In the structure of the invention, the handrail portion 21 has a cross section of closed tubular configuration, when joined at 47 and 49 with the intermediate portion 22. An upper, wall section 51 is of outwardly convex contour, advantageously forming an segment of a circle centered approximately at the point designated at 52 in FIG. 1 The short arcuate wall section 50 also preferably forms a surface segment of the same circle.

Spaced-apart, preferably parallel side walls 53, 54 extend angularly downward and rearward from opposite ends of the arcuate wall section 51 and join with outwardly angled displacement wall sections 55, 56. Arcuate support surfaces 57, 58, and L-shaped notch-forming walls 59, 60 join with the arcuate wall segment 50 and the intermediate web section 45 to complete the closed tubular configuration of the handrail support.

A hollow handrail cover 70, formed of an extruded plastic material, such as rigid polyvinyl chloride, is arranged to be received over and supported by the handrail support portion 21. In a preferred form of the invention, the cover is an open-sided tube of circular defined by arcuate outer surfaces contours, formed at opposite ends with internal retaining flanges 71, 72 of generally triangular configuration arranged for cooperation with retaining notches formed by the notch-forming walls 59, 60. The handrail cover 70 has internal contours conforming to a generally circular envelope of the handrail support and may be installed by applying the opposite edges thereof over the upper arcuate wall section 51 of the handrail support. The retaining flanges 71, 72 will slide along the walls 53, 54 and then be displaced outwardly by the displacement surfaces 55, 56, eventually allowing the retaining flanges 71, 72 to snap into retaining recesses formed by the L-shaped walls 59, 60.

In the illustrated form of the invention, an elongated, thin accent strip 80 of forwardly concave contour, is supported in close fitting relation on the outer surface of the concave walls formed by the intermediate web sections 45, 43. A first retaining flange 81, provided along the lower edge of the accent strip, is arranged to be received in the retaining notch 33, between the flange 41 of the bumper shell and the back wall 24. A second retaining flange 82, provided along the upper edge of the accent strip, is arranged to be closely received between the front retaining flange 72 of the handrail cover and the L-shaped notch-forming wall 60. Thus, as shown in FIG. 1, a combination of the circularly configured handrail cover 70, and the similarly configured arcuate portion 50 of the handrail support, provide for the handrail to be of uninterrupted, substantially circular configuration, from the tip of the front retaining flange 72 to the point 49 at which the arcuate wall sections 50 merges with the intermediate arcuate web section 46.

The arrangement provides for a sturdy, smooth gripping portion, extending over a large fraction of a complete circle, for example as much as 300°. Additionally and equally important, the adjacent touchable surfaces of the cover 70 and its support merge in smooth transition from the convex circular contours of the upper handrail portion to the concave contours of the upper intermediate portion 46 in the back, and the concave accent strip 80, in the front. The concave contours of the accent strip also merge in a smooth, substantially tangential transition with the convex upper wall 40 of the bumper cover 35. This configuration is advantageous in that it minimizes dirt collection, facilitates cleaning and also tends to make the accent strip 80 more readily visible. This is of considerable utility in many institutional buildings, where it is desired to provide color coding by means of the accent strip for easier identification of particular areas of the structure.

As shown in FIGS. 2 and 3, a typical handrail-bumper assembly comprises straight sections 90 mounted along a wall 25 by means of the supports 26. At an outside corner, a special corner assembly 91 is provided to join adjacent, angularly related straight sections 90. While FIG. 3 illustrates an "outside" corner, it will be understood that a similar corner assembly (not shown) is needed for connecting adjacent straight sections at an "inside" corner. The outside corner assemblies can also be used, with minor modification as will appear, to construct "return", providing a transition from an exposed end of a handrail section on a given wall over to an adjacent section of the same wall. The handrail-bumper assembly of the invention includes an advantageous form of corner/return assembly which, insofar as practicable, retains the advantageous utilitarian features of the basic (straight) assembly, as well as the visually pleasing features thereof. At the same time, the assembly is easy to install and forms a sturdy element of the handrail-bumper system.

Figure 6:
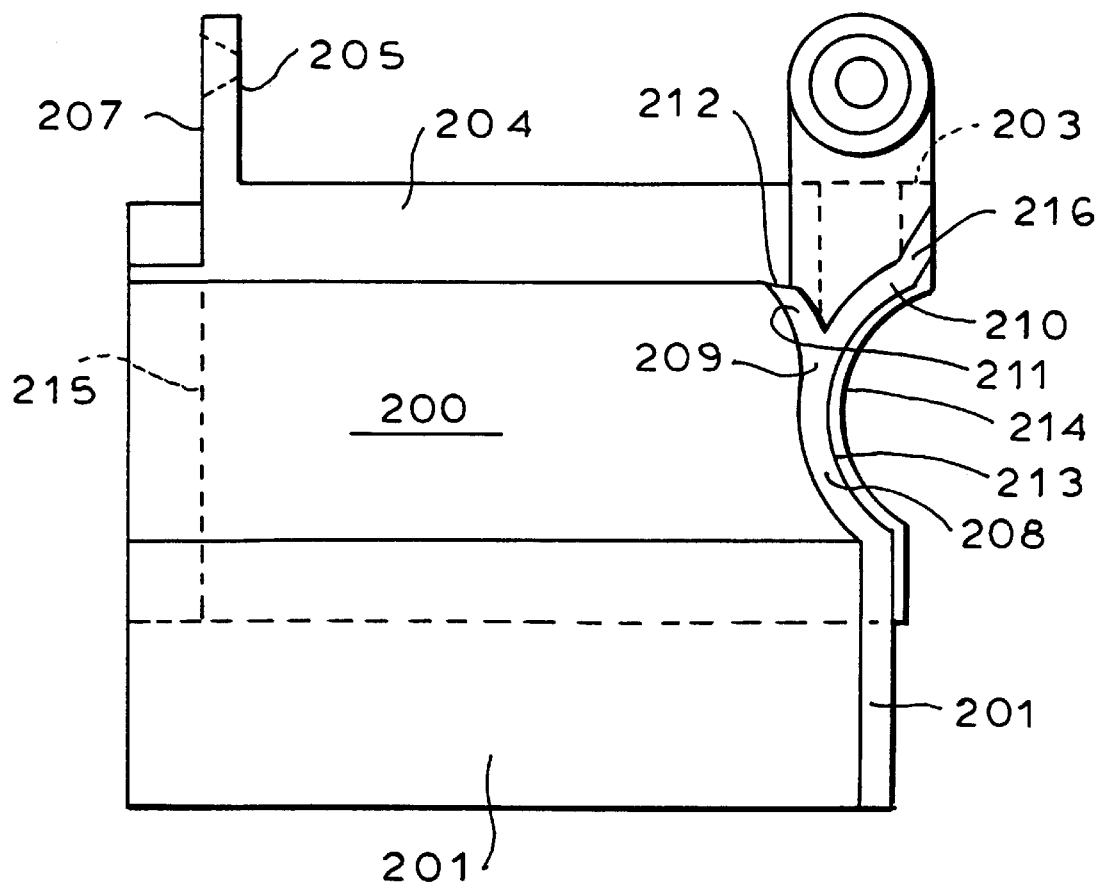
FIGS. 6 and 7 are elevational and top plan views respectively of a molded plastic intermediate member forming part of the corner assembly.
Figure 7:
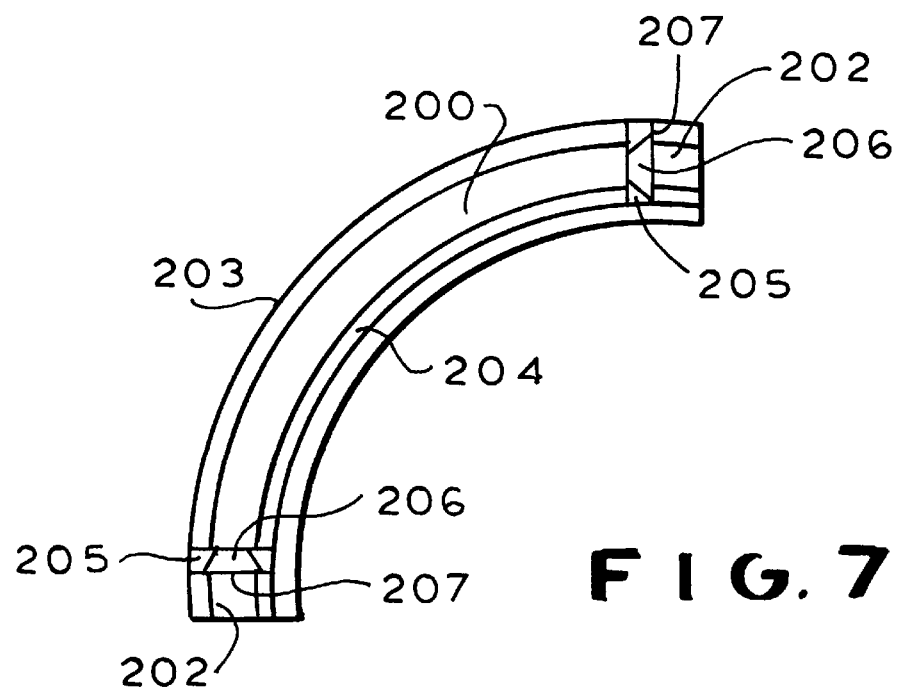
Figure 10:
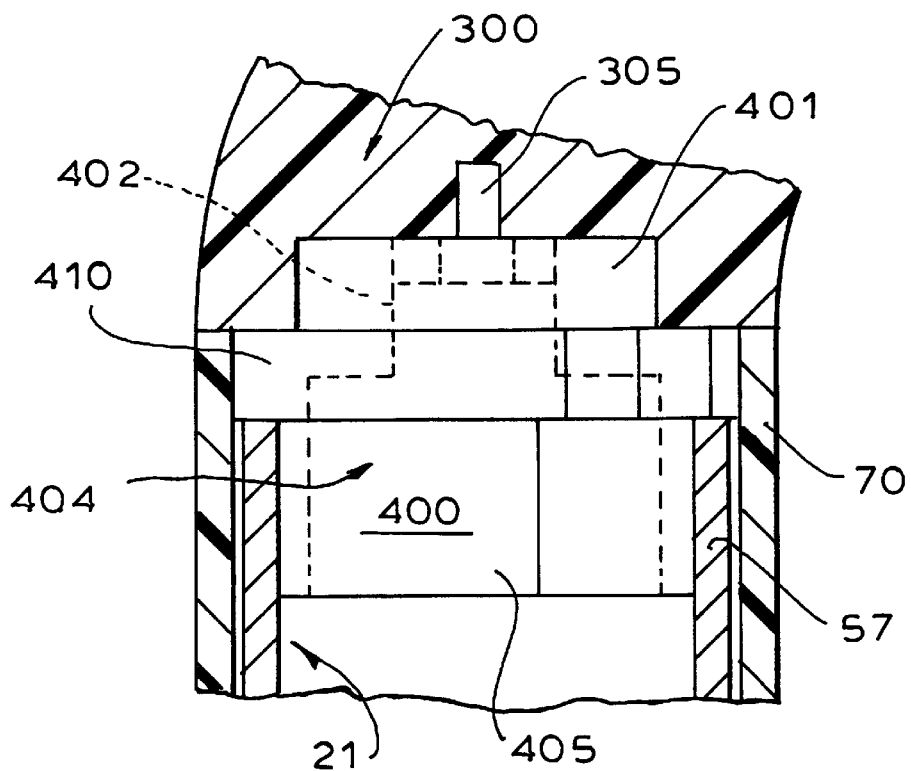
FIG. 10 is a top plan view of a molded end cap member, forming part of the corner structure, with related parts, shown in cross section, illustrated in assembled relation.
Figure 11:
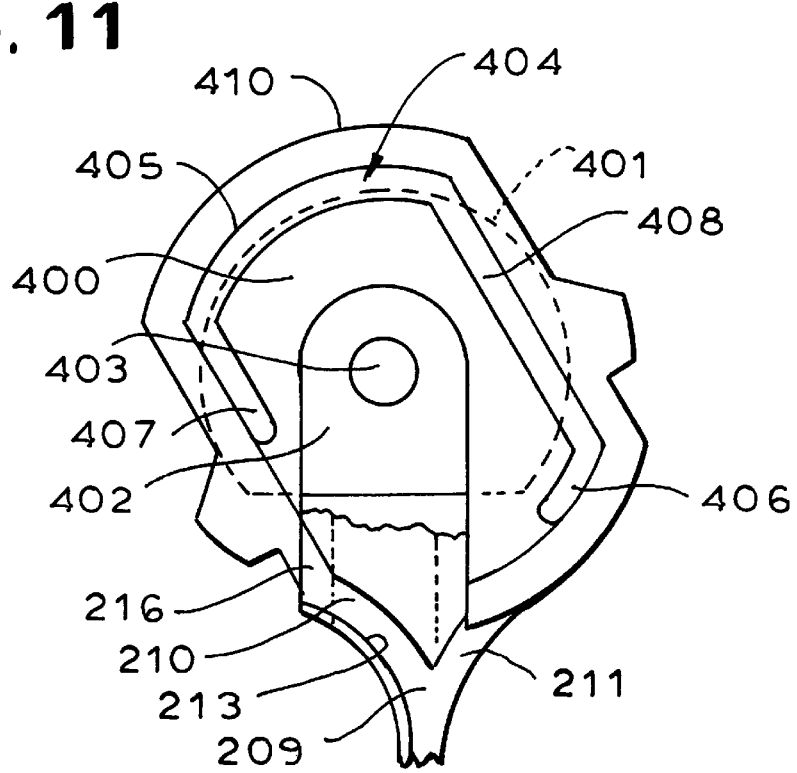
FIG. 11 is an end elevational view of the end cap member of FIG. 10.

An advantageous corner assembly includes a bumper section, shown in FIGS. 4 and 5, an intermediate section, shown in FIGS. 6 and 7, a handrail cap (FIGS. 8–10) and a handrail member (FIGS. 11, 12).

While elements of the straight handrail-bumper sections advantageously are extruded, the corner/return sections, being of arcuate contour, are necessarily molded. And because of the complexity of the multiple contours, it is more economical to construct an assembly of several molded components, than to attempt to produce a complex, one-piece molding.

In FIGS. 4 and 5, there is shown an advantageous form of molding for the bumper portion of an outside corner. The bumper portion 100 is a solid molding of rigid plastic having a front surface 101 formed with contours corresponding substantially to the outer surface contours 36–40 of the bumper cover 35. Inset slightly from the outer surface 101 is a first projecting flange 102, forming an abutment flange, and this flange has contours closely conforming to the front contours of the bumper support portion 23. In this respect, an outwardly convex upper flange portion 103 conforms substantially to the contours of the support flange 34, and a leg 104, which projects downwardly from the upper edge of the flange portion 103 conforms to the vertical leg of the L-shaped retaining flange 32. An upwardly and outwardly inclined flange portion 105 at the bottom corresponds to the displacement flange 28, and the L-shaped portions 106 correspond to the L-shaped sections defining the lower retention notch 27. A vertically extending flange portion 107 connects the upper and lower flange portions 103, 105. A rear flange portion 108 corresponds in location to the vertical back wall 24 of the aluminum support portion 23.

Second and third projecting flanges 109, 110 are provided adjacent the top and bottom respectively. These flanges are shaped to conform respectively to the internal contours of the metal support portion 23, at the top and bottom portions. As shown in FIG. 5, the flange portions 109, 110, which may be referred to as positioning flanges, project from the body of the corner piece well beyond the ends of the abutment flanges 103–108. Fastening tabs 111, 112 also project from the end of the member 100, in a position to lie against the inside surface of the support back wall 24, preferably projecting well beyond the ends of the positioning flanges 109, 110.

As reflected in FIGS. 4 and 5, the various flanges and projections described above are provided at both ends of the bumper corner member 100, accommodating attachment of a straight section of handrail-bumper at each end.

A bumper corner member 100 is attached to a previously installed support member 20 prior to installation of the bumper shell 35, by inserting the positioning flanges 109, 110 and the mounting tabs 111, 112 into an open end of the metal support. The positioning flanges 109, 110 make snug contact with the internal contours of the support to accurately align the corner member 100. The corner member is inserted until the squared-off end of the support 20 makes contact with the various abutment flange surfaces 102–106. The member 100 can then be secured to the support by suitable bolts or the like (not shown) located in openings 113 provided in the mounting tabs 111, 112.

To advantage, the various abutment elements 102–107 project a short distance (for example, ¼ inch) from the end surface 101, which defines the end of the main portion of the bumper member 100, which is contoured to correspond to the outer surface contours of the plastic outer shell 35. In addition, these abutment projections have external contours which are very slightly (e.g., 0.015 inch) larger than the external contours of the metal support member 20. The plastic cover 35, as shown in FIG. 5, is cut to a length correspondingly longer at each end than the metal support 20, so that the cover extends over the outside of the abutment projections 102–107 and abuts with the end surface 101. By providing for the external contours of the abutment projections 102–107 to be slightly larger than the nominal external dimensions of the metal support, it is assured that, at the end extremities of the cover 35, its support and positioning will be determined by the contours of the molded-in abutment projections, so that more precise alignment between the external surfaces of the cover 35 and the external surfaces of the bumper corner element 100 is assured. This provides for a much neater looking joint at the corner, and also one that is less likely to snag or abrade delicate skin of an elderly patient.

As indicated in FIG. 5, the main body portion of the bumper member 100, between the respective end surfaces 101, covers an arc of 90°. The various flanges and other extending portions project in a straight line from the end faces 101, for insertion in supports 20 mounted on adjacent walls disposed at 90°. Where the corner assembly is to be employed as a return, i.e., where the corner assembly is inserted at one end into the end of a handrail support, and the corner assembly then curves into and abuts with the surface of the same wall, all of the projecting flanges and mounting tabs at the wall end are removed, so that the end face 101 can be positioned in confronting relation to the wall surface.

In the illustrated structure, the bumper corner member 100 would not customarily be installed as an individual component, but as an assembly of components constituting a bumper section, an intermediate section and a handrail section. This assembly is customarily made at the factory, so that the field installer deals only with the completed corner assembly. In the illustrated form of the invention, the intermediate element is shown in FIGS. 6 and 7 of the drawing, and the handrail section, shown in FIGS. 8 and 9 of the drawing, and an end cap element is shown in FIGS. 10 and 11 of the drawing.

With reference now to FIGS. 6 and 7, the intermediate corner section 200 comprises a downwardly projecting mounting flange 201 arranged to be mounted on an arcuate upper back wall 115 of the bumper portion 100, directly above the back wall portion 108. This can be assembled by mechanical fasteners, such as sheet metal screws, by adhesives or other means. The intermediate portion has a main body extending over an arc of 90°, and has short, straight extending portions 202 at each end which will, in the assembled corner, interfit with an end cap member, to be described.

The body portion of the intermediate member includes a pair of vertically extending, radially spaced arcuate flanges 203, 204 which terminate at vertical end flanges 205. The latter are drilled at 206 to receive fastening devices, as will be described. The outer end faces 207 of the vertical end flanges 205 are oriented at 90° and define the opposite ends of the main body of the intermediate section 200.

Joining the mounting flange 201 with the upper flanges 203, 204 is an outwardly concave flange 208, which corresponds generally in its contours to those of the intermediate portion 22 of the primary metal support 20. In this respect, the arcuate flange 208 divides at 209 into front and back portions 210, 211 corresponding generally in contours to the flange portions 46, 47 of the metal support (see FIG. 1). The front flange portion 210 terminates at the outer surface of the vertical flange 203, while the back flange portion 211 projects slightly beyond the inner walls of the flange 204, to form an upwardly facing support surface 212.

As reflected in FIG. 6, the outwardly concave flange portions 208, 210 are recessed slightly in the region of the outer extensions 202. The short recess, indicated by the reference numeral 213 in FIG. 6, provides for the reception of a short projecting end portion of the accent strip 80. Over the 90° arcuate portion of the element 200, the outer surface 214 of the concave flange is dimensioned to be substantially flush with the outer surface of the accent strip 80 where the strip abuts with an end surface 215 (FIG. 6). In the short projecting regions 202, the upper end of the concave flange portion 210 joins with a short flange portion 216 (FIG. 6) extending upward at an angle in general correspondence with the lower leg of the L-shaped, notch-forming flange 60 of the handrail portion 21 of the metal support.

Figure 8:
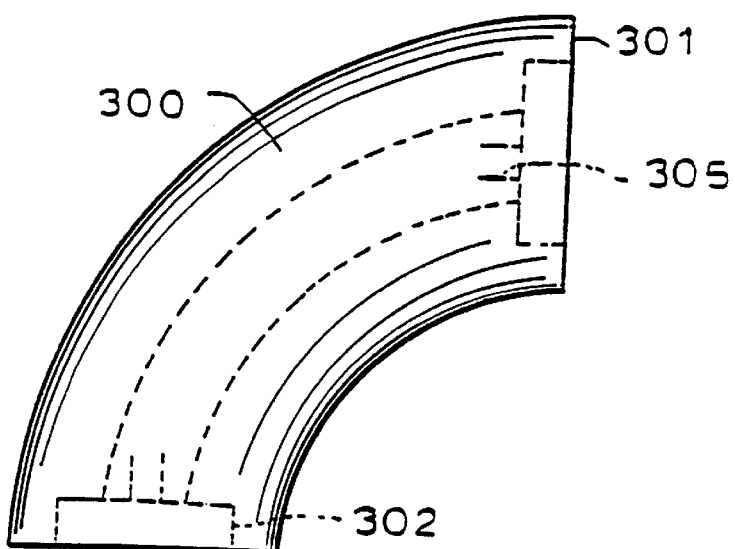
FIGS. 8 and 9 are top plan and side elevational views respectively of an upper or handrail portion of the corner assembly.
Figure 9:
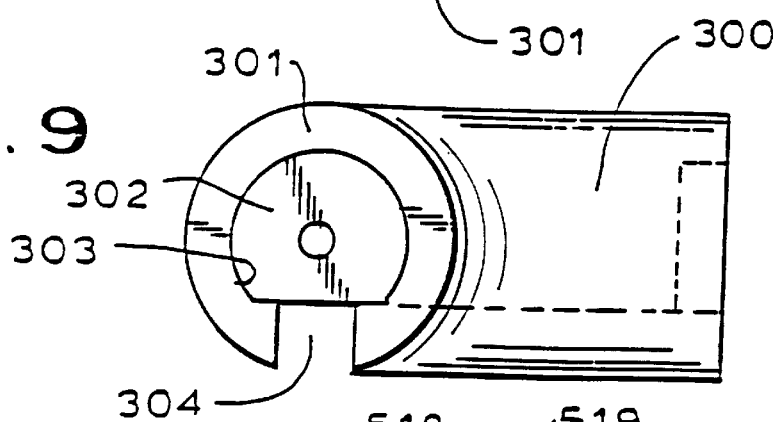

A handrail portion of the corner assembly is indicated by the reference numeral 300 in FIGS. 8 and 9. The element is of generally circular cross section, extending over an arc of 90°, and is formed of a molded plastic material, such as polyvinyl chloride. The dimensions of the circular cross section are substantially identical to those of the handrail cover 70, so that the handrail portion of the corner assembly forms a continuation of the surface contours of the handrail cover.

At each end, the handrail section is formed with a flat end surface 301 and a central recess 302, which can be mostly of circular contours, but has at least some non-circular portion 303 for alignment purposes. Along its bottom, the handrail element 300 is formed with a downwardly opening arcuate recess 304 of a size and shape to closely and snugly receive the arcuate flanges 203, 204 of the intermediate member. In the final assembly, the handrail element 300 is secured to the intermediate member by mechanical fasteners and/or adhesives.

Prior to assembly of the handrail element 300 with the intermediate element 200, end cap elements 400, shown in FIGS. 10 and 11, are mounted at the opposite ends of the handrail element. The end cap element 400 is a precision molded part, formed of a material such as polyvinyl chloride and is formed at one end with a projecting boss 401, the size and shape of which are such as to be snugly received in a recess 302 of the handrail element. Internally, the end cap member has a vertical slot 402 of a size and shape to closely receive the end flanges 205 of the intermediate element. Thus, in assembling a corner unit, the end cap members 400 are assembled with the handrail portion 300, by inserting the projecting bosses 401 into the recesses 302. The end caps are rotationally oriented by reason of the non-circular cross sections of the bosses 401 and recesses 302, as will be understood. When the end caps are assembled, the recesses 402 therein are oriented to open vertically downward, allowing the assembled handrail and end caps to be joined together with the intermediate element 200, with the end flanges 205 being received in the recesses 402 and the flanges 203, 204 being received in the arcuate recess 304 of the handrail element. The intermediate and handrail portions 200, 300, and the end caps 400, can all be secured in a tight permanent assembly by screws installed at each end, entering through the flange openings 206, passing through openings 403 in the end cap elements and being threadedly received in bored recesses 305 in the handrail portions. At this stage of assembly, the just-described subassembly may be joined with the lower bumper unit, by attaching the flange 201 of the intermediate member to the back surface portions 115 of the bumper portion.

It will be understood that the end cap elements 400 are molded for left-hand and right-hand installation such that, when inserted in opposite ends of a handrail element 300, the tilt of the contours will be upward and outward in both cases.

As reflected in FIGS. 10 and 11, the end cap members include an axially projecting flange 404, consisting of upper and lower arcuate portions 405, 406 and spaced-apart, parallel side flange portions 407, 408. The external contours of the flanges 404–408 are such as to generally conform to and be snugly received within the interior of the hollow tubular hand rail support portion 21. The end cap member is also provided with an intermediate portion 410 conforming closely in size and shape to the external contours of the upper portions of the tubular handrail portion 21 of the metal support. Thus, when the projecting flanges 404 of the end cap are inserted axially into the open end of the metal handrail portion 21, the contours of the intermediate collar flange 410 form essentially a continuation of the surface contours of the metal handrail portion 21. Advantageously, however, the dimensions of the end cap intermediate collar flange 410 are just slightly greater (e.g., 0.010–0.015 of an inch), so that the surface line of the overlying handrail shell 70 is more precisely controlled by the molded outer surfaces of the intermediate collar flange 410.

As reflected particularly in FIG. 11, the lower portions of the intermediate collar flange 410 merge with the upper flange portions 210, 211 and 216 of the projecting end portions 202 of the intermediate member, so that the collar flange 410 and the projecting portions 202 of the intermediate member provide a full continuation of the outer contours of the metal support 20.

A complete corner assembly forms a rigid unit of a bumper portion 100, an intermediate portion 200, an upper or handrail portion 300 and end caps 400 at opposite ends. This assembled corner unit is installed on to the end of a handrail support 20, prior to installation of the shell cover 70 and bumper cover 35, and also prior to the installation of the accent strip 80. All of the last mentioned elements are cut to length slightly longer than the metal support 20 (e.g. ¼ inch at each end), so that each of the elements 35, 70, 80 has an end extremity supported by elements of the corner structure which are just slightly larger in dimension than the corresponding dimensions of the metal support, assuring a high level of precision in the surface alignment of corner assemblies with corresponding surfaces of the straight elements.

Assembly of the corner is performed by inserting the projecting flanges 404 of the end cap into the upper portion 21 of the metal support while the alignment flanges 109, 110 of the bumper member 100 are inserted into the lower or bumper portion 23 of the metal support. The assembly is then fixed to the metal support by mechanical fasteners, to attach the mounting tabs 111, 112 to the back wall of the metal support. If desired, for additional strength and support, one or more sheet metal screws, pop rivets or the like may be used to fasten the projecting flanges 404 of the end caps to the end portions of the handrail supports 21. Where such means is employed, it is convenient to install the mechanical fastening means in one or both of the clearance areas 85 (shown in FIG. 1) between the handrail cover 70 and the side flanges 53, 54 of the metal handrail support 21.

The described corner assembly is easily installed and provides a rugged joint between the corner assembly and the primary handrail-bumper unit. In the past, these joints have tended to represent a weak point in the handrail installation. Additionally, where the corner assembly is employed as a return to the wall surface, the recess 302 facing the wall provides an area for a hidden mechanical support at the wall end of the installation, so that weight applied to the corner unit adjacent to the wall does not apply torque to the principal handrail structure. It will be understood, of course, that, when the corner unit is employed as a return to the wall, all of the projecting portions 202 of the intermediate element 200, and all of the projecting flanges and tabs of the bumper portion 100 (at the wall end only in both cases) are removed.

The illustrated components are shown for the assembly of an "outside" corner, as shown in FIG. 3 of the drawings. For the formation of an "inside" corner, the illustrated design permits the interchangeable use of the handrail elements 300 and the end caps 400. However, separate molds are required for the bumper portions 100 and intermediate portions 200 so that the outwardly facing contours are properly oriented in the molded parts. The interchangeable use of the handrail and end cap elements, however, results in considerable savings and mold costs.

Figure 13:
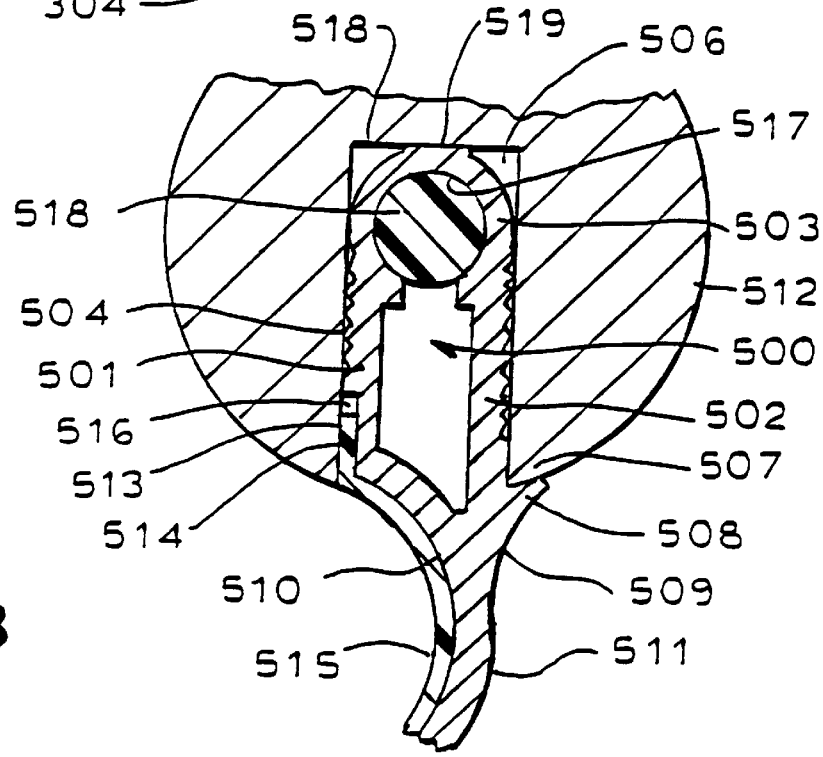
FIG. 13 is an enlarged, fragmentary view of a portion of the structure of FIG. 12, illustrating details of its construction.

An alternative embodiment of the invention, shown in FIGS. 12–14, is designed for the installation of a wood handrail portion, in association with a bumper and accent strip arrangement substantially as described with respect to the embodiment of FIGS. 1–11.

In FIG. 13, there is shown details of the upper assembly of the alternative embodiment, it being understood that portions of the unit below that shown in FIG. 13 can be of the same general construction as previously described. In the alternative embodiment, a tubular upper support portion 500 is defined by generally vertical front and back walls 501, 502 and an arcuate top wall 503. The front and back side walls are deeply serrated, as at 504 to receive an adhesive material. An elongated wooden handrail portion 505, formed with a downwardly opening vertical slot 506, is closely received over the walls of the support portion 500. A lower back edge 507 of the wooden handrail engages and is supported by a rearwardly projecting flange 508 formed by a rearwardly concave flange portion 509. The latter is formed integrally with the forwardly concave, accent strip receiving flange 510 of an intermediate portion 511 of the metal support. As shown particularly in FIG. 13, the rearwardly concave surface portions 509 curve progressively rearward and merge substantially tangentially with the circular external surfaces 512 of the hand grip 505.

The front side wall 510 of the handrail support has a recess 513 for the reception of a retaining flange portion 514 of an accent strip 515. The upper retaining flange 514 is captured between the front wall 501 and the inside front wall portion 516 of the handrail recess 506.

In the installation of so-called wood-over-vinyl or wood-over-wood handrail-bumper assemblies, the proper alignment of successive sections of the wood handrail is a nagging problem. Heretofore, one of the common practices has required the field installation personnel to drill alignment holes in adjacent handrail sections for insertion of an alignment dowel. This cannot be done effectively at the factory, because the exact length of the handrail section in a particular installation may not be known. In the system of the applicant's invention, however, the upper handrail support 500 is provided at a point, typically constituting the center of an installed handrail section, with a continuously extruded, generally circular recess 517, arranged to receive an alignment dowel 518 (FIGS. 13, 14). In this manner, two successive handrail support sections are precisely aligned, regardless of length, because the dowel-receiving recess runs continuously throughout the length of the support. Accurate alignment of the successive supports is thus assured. Accurate alignment of the handrail portions 505 themselves is achieved by accurate machining of the recess 506, so that the closed end surface 518 of the recess is in a known and consistent location. A flat support surface 519 is formed at the top of the support surface 503, enabling the handrail 505 to be firmly and accurately seated on the support 500. This accurate seating is retained by use of suitable adhesive on the internal surfaces or, if preferred, mechanical fastening means. Preferably, the wood employed for the handrails 505 is kiln dried prior to installation, to avoid tendencies for later warpage, etc.

In either of its illustrated forms, the handrail-bumper assembly of the invention provides a particularly advantageous handrail mounting and support, with tangentially merging smooth arcuate contours front and back providing an unusually comfortable hand grip facility, which both feels good to the touch and is substantially free of recesses and edges, which are irritating sources of discomfort and, in cases, minor injury.

In the embodiment of FIGS. 1–11, an especially advantageous form of plastic handrail structure is provided, which includes a generally closed tubular upper support formed with a large area, forwardly and upwardly facing arcuate support surface for an extruded plastic handrail cover. In addition, the support is provided with flanges forming L-shaped retaining recesses, for capturing generally triangular internal retaining flanges at each edge of the handrail cover. The structure enables the retaining flange portions of the cover to taper to an edge, merging smoothly into continuing arcuate surfaces along the underside of the handrail support. The arrangement provided is not only aesthetically superior in significant ways, but is also functionally superior in reducing to a minimum angular surfaces which, even if concealed on the back of the handrail, are detectable by feel by users of the handrail and are the source of annoyance, discomfort, and possible minor injury.

The described system is provided with a new and advantageous form of corner or return assembly, which provides an unusually strong joint and which, by reason of its construction, provides a significantly neater and functionally superior corner joint.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. A handrail-bumper assembly comprising
    (a) an elongated metal support member of uniform cross section adapted for mounting in spaced relation to a wall and having a forward side, for facing away from said wall, and a rearward side for facing toward said wall,
    (b) said support member having a support lower portion, a support intermediate portion, and a support upper portion,
    (c) a bumper cover member formed of rigid plastic material and mounted on a forward face of said support lower portion, (d) said bumper cover member having a forwardly convex upper wall curving upward and rearward from a generally vertical forward wall, (e) said support intermediate portion comprising a forwardly concave web section integral with said support lower portion and extending generally upward from an upper rearward edge of said support lower portion, (f) lower contours of said forwardly concave web section extending adjacent contours of the forwardly convex upper wall of the bumper cover member and providing a generally smooth continuation of contours, (g) said support intermediate portion further including a rearwardly concave arcuate web section, integral with upper portions of said forwardly concave web sections merging tangentially therewith and extending upward and rearward therefrom forming a section of generally Y-shaped cross sectional configuration, (h) said support upper portion comprising a handrail support including an upper wall section and spaced apart side wall sections joined integrally with said section of generally Y-shaped configuration to form a rigid cross section of closed tubular configuration, (i) a hollow handrail cover, separate from said bumper cover member, having internal surfaces with predetermined contours, open along a lower side and comprising an arcuate upper wall portion and arcuate opposite side wall portions, (j) said handrail cover being received over and supported by said support upper portion, (k) the upper wall section of said handrail support having contours conforming to upper internal surface portions of said handrail cover to provide rigid support thereof, (l) said handrail cover being formed of rigid plastic material and having smoothly convex outer contours merging generally tangentially with surfaces on the rearward side of said support upper portion and with the upper portions of said forwardly concave web section.

2. A handrail-bumper assembly according to claim 1, wherein (a) said upper wall section of said handrail support includes a first arcuate section, forming upper forward portions of said handrail support supporting said arcuate upper wall portion of said handrail cover, and said spaced apart side wall sections having opposed second and third arcuate sections, spaced on each side of said first arcuate section, for supporting respective side wall portions of said handrail cover.

3. A handrail-bumper assembly according to claim 2, wherein (a) said handrail support includes generally downwardly facing notch-forming walls formed directly below said second and third arcuate sections, (b) the respective side wall portions of said handrail cover having generally upwardly facing retaining flanges formed adjacent end extremities thereof, engaging said downwardly facing notch-forming walls.

4. A handrail-bumper assembly according to claim 3, wherein (a) said upwardly facing retaining flanges are of generally triangular configuration.

5. A handrail-bumper assembly comprising (a) an elongated metal support member of uniform cross section adapted for mounting in spaced relation to a wall and having a forward side, for facing away from said wall, and a rearward side, for facing toward said wall, (b) said support member having a rigid handrail portion of closed tubular configuration and including (i) an upper wall section of arcuate configuration, (ii) spaced apart side wall sections joined integrally at upper ends thereof with said arcuate upper wall section on opposite sides thereof, (c) retaining flanges extending outwardly from lower end portions of said side walls, (d) a handrail cover of extruded plastic construction and of generally convex arcuate internal and external configuration, (e) said handrail cover having a continuous opening along a bottom side thereof received over upper portions of said handrail portion, (f) said handrail cover having continuous, inwardly projecting flanges on opposite sides of said continuous opening positioned in locking engagement with the retaining flanges of said handrail portion, (g) portions of said handrail portion, extending below said handrail cover, being of a generally Y-shaped cross sectional configuration, and (h) said portions of generally Y-shaped cross section being formed with front and rear concave arcuate external contours merging generally smoothly with lower, convex external contours of said handrail cover.

6. A handrail-bumper assembly according to claim 5, wherein (a) the arcuate upper wall section of said handrail portion has contours continuously underlying internal arcuate contours of said handrail cover over an arcuate segment of said upper wall section extending substantially from one side wall to the other.

7. A handrail-bumper assembly according to claim 6, wherein (a) said arcuate upper wall section and said side walls are oriented to have an outward tilt when mounted, to provide optimum support to resist downwardly directed forces applied thereto.

8. A handrail-bumper assembly according to claim 5, wherein (a) said side walls, in regions between said arcuate upper wall section and said retaining flanges, being spaced from arcuate inner walls of said handrail cover to provide clearance spaces.

* * * * *